US012741253B2

(12) United States Patent
Wolf

(10) Patent No.: US 12,741,253 B2
(45) Date of Patent: Sep. 22, 2026

(54) APPARATUSES, SYSTEMS, AND METHODS FOR STORING, MIXING, AND DELIVERING SLURRIES

(71) Applicant: WOLF PROCESS TECHNOLOGY, LLC, Katy, TX (US)

(72) Inventor: Mark Ernest Wolf, Katy, TX (US)

(73) Assignee: WOLF PROCESS TECHNOLOGY, LLC, Katy, TX (US)

(*) Notice: Subject to any disclaimer, the term of this patent is extended or adjusted under 35 U.S.C. 154(b) by 799 days.

(21) Appl. No.: 18/093,754

(22) Filed: Jan. 5, 2023

(65) Prior Publication Data

US 2023/0264155 A1 Aug. 24, 2023

Related U.S. Application Data

(60) Provisional application No. 63/297,120, filed on Jan. 6, 2022.

(51) Int. Cl.

| | |
|---|---|
| ***B01F 23/00*** | (2022.01) |
| ***B01F 23/50*** | (2022.01) |
| ***B01F 25/10*** | (2022.01) |
| ***B01F 25/51*** | (2022.01) |

(Continued)

(52) U.S. Cl.

CPC ............ *B01F 23/566* (2022.01); *B01F 23/59* (2022.01); *B01F 25/104* (2022.01); *B01F 25/51* (2022.01); *B01F 2025/913* (2022.01); *B01F 2101/49* (2022.01)

(58) Field of Classification Search

CPC ........ B01F 23/566; B01F 25/51; B01F 23/59; B01F 2101/49; B01F 25/104; B01F 2025/913

See application file for complete search history.

(56) References Cited

U.S. PATENT DOCUMENTS

| | | | |
|---|---|---|---|
| 4,819,878 | A | 4/1989 | Bailey et al. |
| 4,952,099 | A | 8/1990 | Drobadenko et al. |
| 4,978,251 | A | 12/1990 | Drobadenko et al. |

(Continued)

FOREIGN PATENT DOCUMENTS

| | | |
|---|---|---|
| CA | 2230306 | 8/1999 |
| EP | 2 481 693 B1 | 11/2013 |

(Continued)

OTHER PUBLICATIONS

International Search Report and Written Opinion issued by the United States Patent and Trademark Office as International Searching Authority for PCT/US2023/010320, dated Mar. 27, 2023, 14 pgs.

*Primary Examiner* — Anshu Bhatia

(74) *Attorney, Agent, or Firm* — PATENT PORTFOLIO BUILDERS PLLC

(57) ABSTRACT

A piping manifold that combines multiple solids fluidizers with a common motive fluid connection and a common slurry discharge connection. The manifold utilizes flexible pipe materials to connect the individual fluidizer feed and discharge connections to a distribution and a collection hub that are combined into a single structure with a common dividing plate between the distribution and collection chambers. An adjustable support structure that allows adjustable positioning of the individual fluidizers without customized design, manufacturing or modification of the manifold.

18 Claims, 6 Drawing Sheets

(51) Int. Cl.
*B01F 25/00* (2022.01)
*B01F 101/49* (2022.01)

(56) References Cited

U.S. PATENT DOCUMENTS

| | | | | |
|---|---|---|---|---|
| 4,992,006 | A | 2/1991 | Drobadenko et al. | |
| 5,853,266 | A | 12/1998 | Parkinson et al. | |
| 6,942,735 | B2 * | 9/2005 | Rich | E04D 15/07 118/313 |
| 7,179,386 | B2 | 2/2007 | Lange | |
| 7,309,445 | B2 | 12/2007 | Lange et al. | |
| 7,314,441 | B2 | 1/2008 | Collier | |
| 7,655,061 | B2 | 2/2010 | Parkinson | |
| 7,718,061 | B2 | 5/2010 | Delves et al. | |
| 7,997,419 | B2 | 8/2011 | Parkinson | |
| 8,297,830 | B2 | 10/2012 | Tseng et al. | |
| 8,371,323 | B2 | 2/2013 | Delves | |
| 8,628,276 | B2 | 1/2014 | Delves et al. | |
| 8,807,062 | B2 | 8/2014 | Tahar et al. | |
| 8,871,089 | B2 | 10/2014 | Early et al. | |
| 8,968,481 | B2 | 3/2015 | Henderson | |
| 9,527,013 | B2 | 12/2016 | Abdalla et al. | |
| 9,610,604 | B2 * | 4/2017 | Galvin | B05B 9/007 |
| 9,770,804 | B2 | 9/2017 | Byers et al. | |
| 9,816,359 | B2 | 11/2017 | Wolf et al. | |
| 10,267,536 | B1 | 4/2019 | Templin | |
| 10,376,854 | B2 | 8/2019 | Hildreth et al. | |
| 2004/0094848 | A1 | 5/2004 | Lange | |
| 2006/0177280 | A1 | 8/2006 | Von Keudell et al. | |
| 2008/0232907 | A1 | 9/2008 | Snowdon | |
| 2008/0251468 | A1 | 10/2008 | Parkinson | |
| 2020/0263830 | A1 | 8/2020 | Stradiotto et al. | |
| 2021/0180577 | A1 | 6/2021 | King et al. | |

FOREIGN PATENT DOCUMENTS

| | | | |
|---|---|---|---|
| RU | 2735960 | C1 | 11/2020 |
| WO | WO 2003/064053 | A1 | 8/2003 |
| WO | WO 2004/050210 | A1 | 6/2004 |

* cited by examiner

APPARATUSES, SYSTEMS, AND METHODS FOR STORING, MIXING, AND DELIVERING SLURRIES

CROSS-REFERENCE TO RELATED APPLICATIONS

This application claims benefit of U.S. provisional patent application Ser. No. 63/297,120 filed Jan. 6, 2022 and entitled "Apparatuses, Systems, and Methods for Storing, Mixing, and Delivering Slurries," which is hereby incorporated herein by reference in its entirety for all purposes.

STATEMENT REGARDING FEDERALLY SPONSORED RESEARCH OR DEVELOPMENT

Not applicable.

BACKGROUND OF THE INVENTION

This invention relates to removal of solids and transferring slurry from a tank or a pressurized vessel. In many industrial processes and in processing of oil & gas fluids, it is necessary to accumulate fluids in tanks and pressure vessels. Solids that are entrained in the fluids can settle and accumulate in the bottom of the tanks and vessels where the fluids are accumulated. The accumulated, settled solids must periodically be removed from the tanks and vessels. Removal strategies include offline methods that require the tank or vessel to be taken out of service and drained to allow a physical removal process, and online methods that employ methods and apparatuses to remove the solids without draining the tank.

BRIEF SUMMARY OF THE INVENTION

One method of online solids removal involves the use of a cyclonic fluidizing apparatus that creates hydraulically induced vortices to fluidize the settled solids which are then removed as slurries or mixtures. When a plurality of cyclonic fluidizing apparatuses (fluidizers) are required, it is advantageous to combine them into groups using manifolds. This invention comprises a manifold of flexible pipe materials and a central hub that increases flexibility in positioning the fluidizers while simultaneously reducing engineering and manufacturing customization.

BRIEF DESCRIPTION OF THE DRAWINGS

For a detailed description of the disclosed, representative embodiments, reference will now be made to the accompanying drawings, which include the following figures, wherein.

NOMENCLATURE

Figure 1:
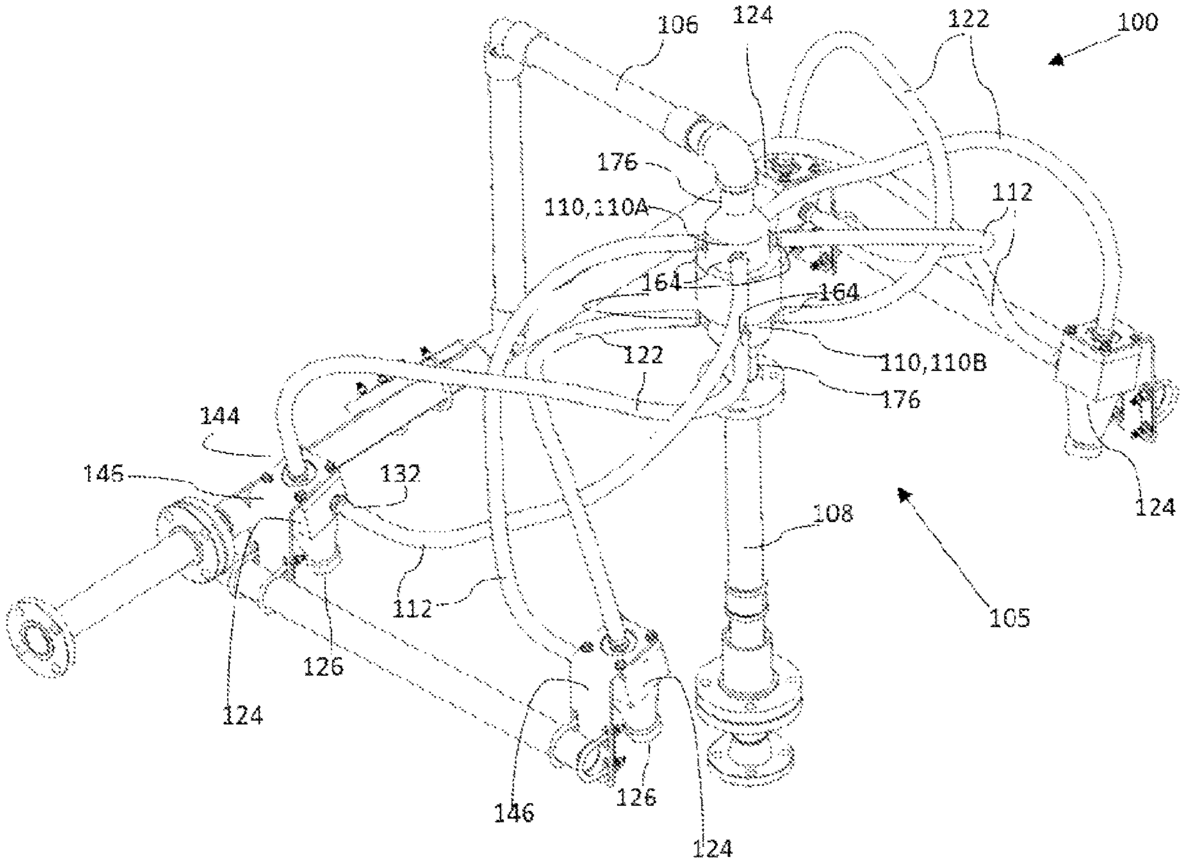
FIG. 1 shows a perspective view of a slurry dispensing system in accordance with principles disclosed herein.

The following description is exemplary of certain embodiments of the disclosure. One of ordinary skill in the art will understand that the following description has broad application, and the discussion of any embodiment is meant to be exemplary of that embodiment and is not intended to suggest in any way that the scope of the disclosure, including the claims, is limited to that embodiment.

The figures are not drawn to-scale. Certain features or components disclosed herein may be shown exaggerated in scale or in somewhat schematic form, and some details of some elements may not be shown in the interest of clarity and conciseness. In some of the figures, in order to improve clarity and conciseness, one or more components or aspects of a component may be omitted or may not have reference numerals identifying the features or components. In addition, within the specification, including the drawings, like or identical reference numerals may be used to identify common or similar elements.

As used herein, including in the claims, the terms "including" and "comprising," as well as derivations of these, are used in an open-ended fashion, and thus are to be interpreted to mean "including, but not limited to . . . ." Also, the term "couple" or "couples" means either an indirect or direct connection. Thus, if a first component couples or is coupled to a second component, the connection between the components may be through a direct engagement of the two components, or through an indirect connection that is accomplished via other intermediate components, devices and/or connections. The recitation "based on" means "based at least in part on." Therefore, if X is based on Y, then X may be based on Y and on any number of other factors. The word "or" is used in an inclusive manner. For example, "A or B" means any of the following: "A" alone, "B" alone, or both "A" and "B." In addition, the word "substantially" means within a range of plus or minus 10%.

Furthermore, any reference to a relative direction or relative position is made for purpose of clarity, with examples including "top," "bottom," "up," "upper," "upward," "down," "lower," "clockwise," "left," "leftward," "right," "rightward," "internal, and "external". For example, a relative direction or a relative position of an object or feature may pertain to the orientation as shown in a figure or as described. If the object or feature were viewed from another orientation or were implemented in another orientation or position, it may then be helpful to describe the direction or position using an alternate term.

As used herein, including in the claims, "piping" and "line," when referring to plumbing, may be used interchangeably and may include any of the following, whether alone or in any combination: pipe, tubing, hose, fittings, or any other tubular member suitable for containing or moving a fluid in a system described herein. Therefore, the "piping" or "line" may include, as examples, any of valve(s), instrument(s), or port(s) for controlling, measuring, or accessing a fluid in the line. The term fluid circuit may be descriptive of piping or a line disclosed herein. Other potential variations and supplements will be understood by those skilled in the art.

DETAILED DESCRIPTION OF THE DISCLOSED EXEMPLARY EMBODIMENTS

FIG. 1 presents an example of a slurry dispensing system 100 based on the principals described herein for delivering and extracting a fluid from a volume, such as a fluid volume in a pond or in a vessel, which may be open or closed. During delivery, the fluid may be a liquid, a gas, or a mixture, and during extraction, the fluid may be a slurry, as examples. In this embodiment, system 100 includes a slurry intake assembly 105 coupled to an inlet line 106 and an outlet line 108. During operation, inlet line 106 serves as a flow path for delivering a supplied fluid from a supply line or another source. During operation, outlet line 108 serves as a flow path for the discharge of a fluid or slurry retrieved through intake assembly 105 from a vessel or another volume. Inlet line 106 and outlet line 108 include rigid piping that supports and fixes the placement of intake assembly 105, including hub manifolds 110 and fluidizers 124. Additional apparatus may be included for supporting or fixing the placement of lines 106, 108. In some embodiments, inlet line 106 or outlet line 108 includes flexible piping and additional apparatus may be included for supporting or fixing the placement of intake assembly 105, including hub manifolds 110 and fluidizers 124, independently of line 106 or line 108. In some embodiments, inlet line 106 and outlet line 108 are considered to be members of slurry intake assembly 105.

Slurry intake assembly 105 includes a plurality of hub manifolds 110 coupled to a plurality of fluidizers 124 by pairs of flexible distribution lines 112 and flexible gathering lines 122 for fluid communication. A first of the hub manifolds 110 is positioned as an inlet manifold 110A, having a combined flow port 176 coupled to inlet line 106 as a manifold inlet port for fluid communication and having multiple distributed ports 164, with each distributed ports 164 coupled to one of the distribution lines 112 for fluid communication. Therefore, the distributed ports 164 of inlet hub manifold 110A are arranged in assembly 105 as distribution or outlet ports. A second hub manifold 110 is positioned as an outlet hub manifold 110B, having a combined flow port 176 coupled to outlet line 108 as a manifold outlet port for fluid communication and having multiple distributed ports 164, with each distributed ports 164 coupled to one of the gathering lines 122 for fluid communication. Therefore, the distributed ports 164 of outlet hub manifold 110B are arranged in assembly 105 as receiving or inlet ports.

Because distribution lines 112 and gathering lines 122 are flexible, they can be moved relative to hub manifolds 110A, 110B while they are fluidically connected to hub manifolds 110A, 110B. For example, when an end of a line 112, 122 is directly coupled to a hub manifold 110A, 110B, that connected end may not move laterally relative to the hub manifold, but another portion of the line 112, 122 could be moved relative to the hub manifold. As a result, fluidizers 124 may be repositioned while remaining fluidically coupled to lines 112, 122 and hub manifolds 110A, 110B. Even so, in some embodiments or during methods of operation, it may be advantageous to loosen, to disconnect, or to connect a fluid connection associated with a fluidizer 124 prior to moving fluidizer 124. The decision to loosen, to disconnect, or to connect may be based on the angular or the lateral distance by which fluidizer 124 is to be moved, as examples. Some embodiments or methods of operation may require loosening a fluid connection prior to moving fluidizer 124. Some embodiments or methods of operation may require disconnecting or connecting a fluid connection prior to moving fluidizer 124

In some embodiments, distribution lines 112 and gathering lines 122 are flexible hoses. In embodiments for which the multiple gathering lines 122 of intake assembly 105 have equal lengths and diameters or have an equalizing set or quantity of another piping feature or features, the gathering lines 122 are hydraulically balanced, to be balanced with respect to fluid flow. Equal lengths of gathering lines 122 correspond to manifold outlet port 176 being equidistant from each of the fluidizers 124, defining equidistant flow paths. In embodiments for which gathering lines 122 are flow balanced and are each coupled to a fluidizer 124, intake assembly 105 is also balanced with respect to fluid flow.

Continuing to reference FIG. 1, each fluidizer 124 includes a fluid inlet 132 to receive a supplied fluid, includes an open end 126 to discharge the supplied fluid into a volume and to receive the fluid, from the volume, and includes a slurry exit 144 to deliver the received fluid to a destination. The fluid received from the volume may be similar to the supplied fluid, or may be a solution with dissolved solids or a slurry formed from the supplied fluid, as examples. Like fluidizer 324 of FIG. 2, the open end of fluidizer 124 includes an annular fluid exit and a slurry inlet, but in some embodiments, open end 126 and the fluid exit are configured differently than an annular passage disposed about the slurry inlet. Fluidizer 124 includes a mounting feature, which in this example is a mounting bracket 146 disposed on the body of each fluidizer 124 and spaced apart from fluid inlet 132 and slurry exit 144. For each fluidizer 124, fluid inlet 132 is coupled to a distribution line 112 to receive a supplied fluid from the inlet hub manifold 110A, which is therefore arranged to perform as a fluid distribution source, and slurry exit 144 is coupled to a gathering line 122 to deliver the received fluid to the outlet hub manifold 110B, which is therefore arranged to perform as a gathering manifold with respect to the multiple fluidizers 124.

The example of FIG. 1 includes four fluidizers 124. Some other embodiments may have more or fewer fluidizers 124, and the hub manifolds 110 (or equivalently 110A, 110B) may be modified or partially capped to accommodate the different quantity of fluidizers. As examples, in various embodiments, a hub manifold 110 may be modified and coupled to two, three four, or five fluidizers 124, and some embodiments may accommodate six, seven, or eight fluidizers 124 or more or similar quantities of fluidizers of another design. Slurry intake assembly 105 may be hydraulically balanced for the several fluidizers. Other embodiments may include still more fluidizers coupled to hub manifold 110, up to a practical limit based on space or another engineering principle. As an example, the successful use of any particular number of fluidizers will depend, at least in part, on the pumping power available for delivering fluid to slurry intake assembly 105. It should be noted that hub manifold 110 and slurry intake assembly 105 may be coupled to a quantity of fluidizers that is not divisible by the number two. Some embodiments have an even number of fluidizers while other embodiments have an odd number of fluidizers coupled to an appropriately configured hub manifold 110, which may be configured and plumbed to achieve balanced flow among the multiple fluidizers. The balancing of flow may be achieved whether the hub manifold 110 is distributing flow to or receiving fluid from the multiple fluidizers. Typically, another, similar hub manifold 110 with the same number of connections would be installed to perform the other task, for example, to receive or distribute flow. Alternatively, some embodiments of slurry intake assembly 105 may instead include multiple hub manifolds plumbed to perform as outlet manifolds and a single, larger hub manifold with a sufficient number of distributed ports 164 could be installed to perform as an inlet manifold. Thus, for a particular slurry intake assembly, a larger, inlet hub manifold may have more distributed ports than any of the multiple outlet hub manifolds positioned to receive fluid or slurry from the fluidizers. The opposite arrangement is also possible, using multiple inlet hub manifolds in conjunction with a single, larger capacity outlet hub manifold. The flexibility in the selection of the number of flow paths and coupled fluidizers is based on the hub configuration of the hub manifold 110, which includes a plurality of circumferentially distributed ports 164 to achieve a circumferentially distributed flow pattern. Circumferentially distributed ports 164 may uniformly distribute fluid to or gather fluid from multiple lines simultaneously. The incoming and outgoing flow paths depend on how a particular hub manifold is plumbed to adjacent equipment. In the embodiment shown, hub manifolds 110 are further augmented by the use of flexible lines between the hub manifolds and the fluidizers. The multiple, circumferentially distributed ports 164 configure the manifold 110 to have a generally radial pattern of flow paths leading to or emanating from a shared outlet or inlet flow path.

Figure 2:
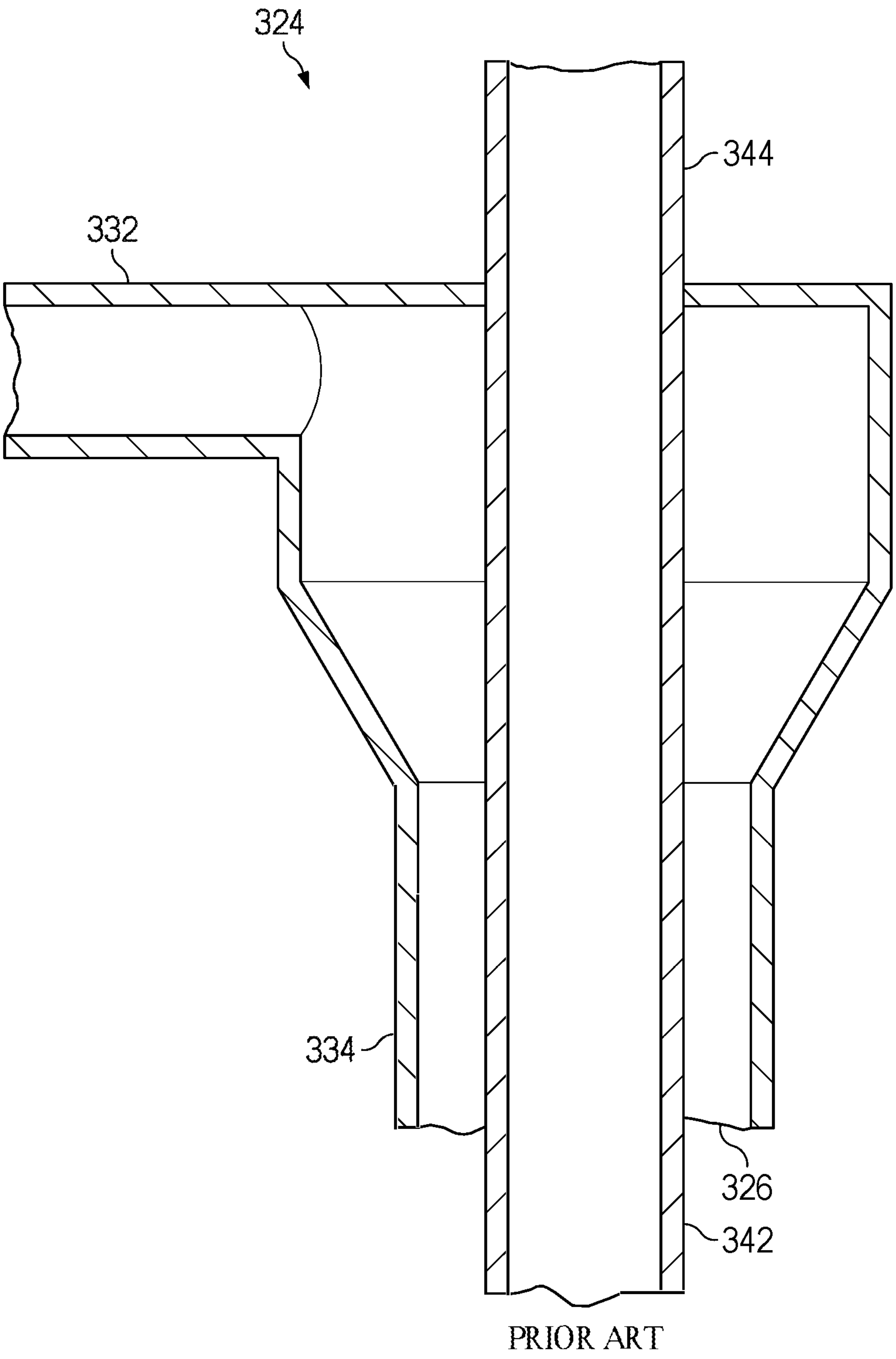
FIG. 2 shows a sectional side view of a prior art fluidizer.

FIG. 2 shows a prior art fluidizer 324, which, for some embodiments of slurry intake assembly 100, may be used as the fluidizer 124 of FIG. 1. The basic structure of fluidizer 324 is disclosed in U.S. Pat. No. 5,853,266 by David Parkinson, et al., issued Dec. 29, 1998, and entitled "Fluidising Apparatus," which is incorporated herein by reference in its entirety for all purposes. Fluidizer 324 includes fluid inlet 332 coupled for fluid transfer to an annular fluid exit 334, a port for incoming fluid, disposed on an open end 326 of fluidizer 324. Fluidizer 324 includes a slurry inlet 342, a port for receiving fluid, for example a slurry, from a volume of fluid. Slurry inlet 342 is centrally disposed and surrounded by annular fluid exit 334 at the open end 326 and coupled for fluid transfer to a slurry exit 344. U.S. Pat. No. 5,853,266 also discloses other fluidizers that are thought to be suitable for use as fluidizer 124 in the current disclosure. Other fluidizers known in the art may also be suitable for use as fluidizer 124.

In some embodiments, fluidizer 124 of FIG. 1 is configured as or includes structure similar to a venturi or an eductor, which may include unique flow features as compared to fluidizer 324 of FIG. 2. In some embodiments distinct from FIG. 2, fluidizer 124 of FIG. 1 may include an open end and fluid exit configured differently than fluid exit 334, which is an annular passage disposed about slurry inlet 342 at open end 326.

Figure 3A:
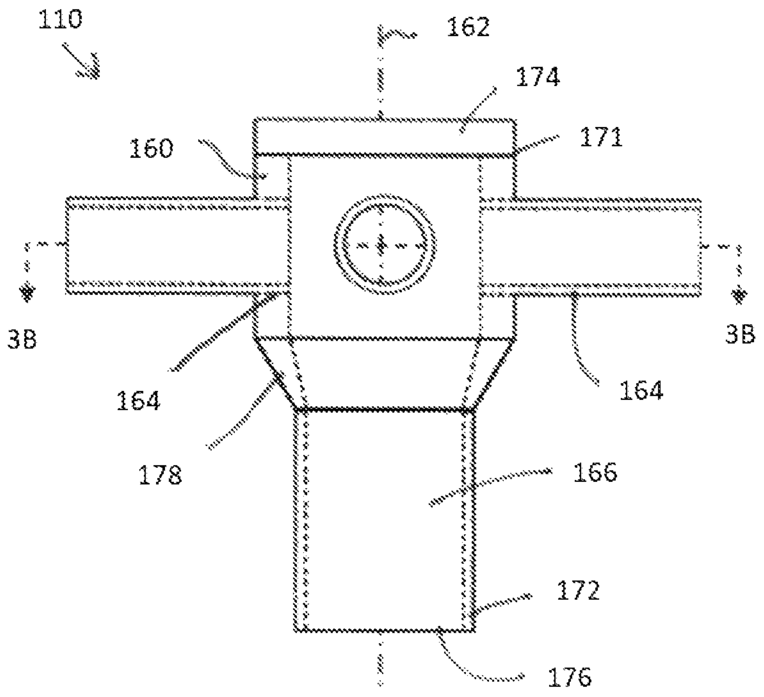
FIG. 3A and FIG. 3B show a side view and an end view, respectively, of a hub manifold such as is used in the slurry dispensing system of FIG. 1 in accordance with principles disclosed herein.
Figure 3B:
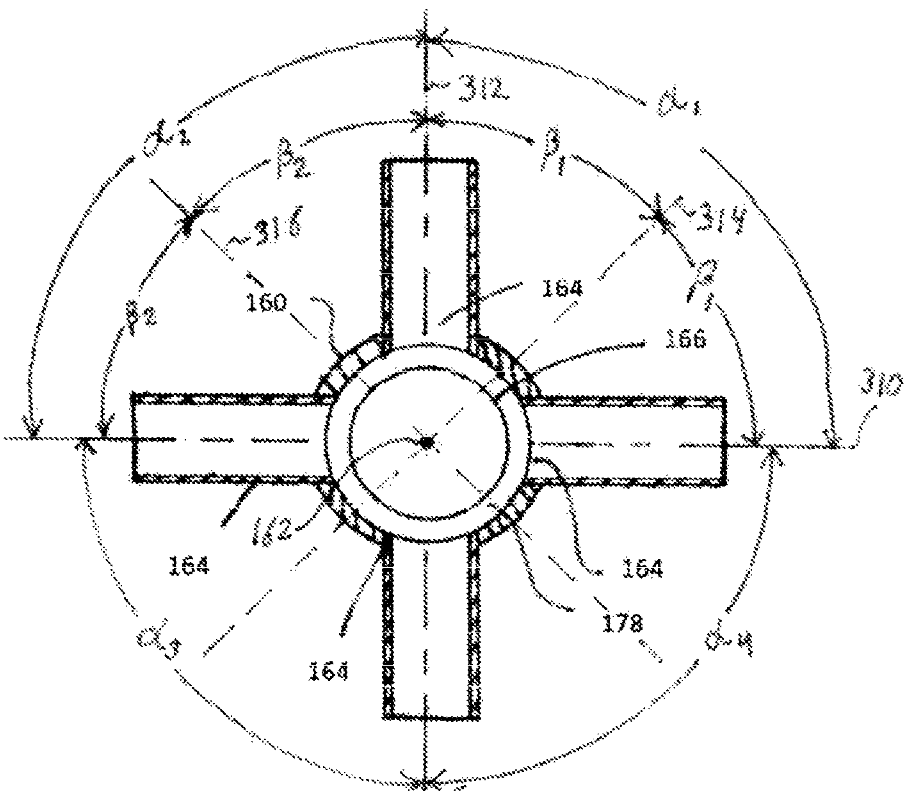

FIG. 3A and FIG. 3B show a closer view of hub manifold 110. Hub manifold 110 includes a hub member 160 extending along a longitudinal axis 162 and the plurality of distributed ports 164 extending through hub member 160. Hub member 160 includes a body with a passageway 166 extending along axis 162 from a first end 171 to a second end 172. The body of tubular member 160 may be tubular as an example. At the first end 171, passageway 166 is sealed by a cap 174, and second end 172 is open at a combined flow port 176. As explained for FIG. 1, a combined flow port 176 of a first hub manifold 110 may be coupled for fluid transfer from an inlet line 106, making it a manifold inlet port, and on another hub manifold 110, a combined flow port 176 may be coupled for fluid transfer to an exit line 108, making it a manifold outlet port. Continuing to reference FIG. 3A and FIG. 3B, passageway 166 includes a reducing taper 178 between ends 171, 172, and therefore passageway 166 is larger at first end 171 and is smaller at second end 172, with respect to cross-sectional area perpendicular to axis 162, which is the area available for flow parallel to axis 162 leading to or from combined flow port 176.

Continuing to reference FIG. 3B, distributed ports 164 are in fluid communication with passageway 166 and, thereby, with combined flow port 176. Distributed ports 164 are disposed at first end 171 and are circumferentially distributed about axis 162 and passageway 166. The displayed example has four ports 164 extending radially through the sidewall of hub member 160. In some embodiments, distributed ports 164 extend through the side wall of hub member 160 along non-radial, e.g., a non-intersecting, non-planar, or non-perpendicular, paths with respect to axis 162. In some embodiments, the plurality of distributed ports 164 instead extend through cap 174 in a circumferentially distributed pattern, and some of these embodiments also include circumferentially distributed ports 164 in the sidewall of hub member 160. Ports 164 may be coupled to connection lines by threading, welding, flanges, clamping, compression fittings, or any other suitable method of coupling known in the art. The four ports 164 of the displayed example are circumferentially distributed uniformly about axis 162 and include tubular members extending outward to facilitate coupling with connection lines. The uniform distribution of ports 164 around axis 162 is indicated by equal angles $\alpha 1$, $\alpha 2$, $\alpha 3$, $\alpha 4$ (alpha 1, alpha 2, etc.) in FIG. 3B. Consequently, in the view of FIG. 3B, hub manifold 110 is symmetric and, likewise, its four ports 164 are symmetric with respect to a central axis 310 that passes through two of the ports 164, which are disposed opposite each other, and the arrangement is symmetric with respect to a central axis 312 that passes through the other pair of opposing ports 164. Hub manifold 110 and ports 164 are also symmetric with respect to an axis 314 disposed circumferentially equidistant from central axis 310 and central axis 312, as indicated by equal angles $\beta 1$ (beta 1), which in this example are 45 degrees. Likewise, hub manifold 110 and ports 164 are symmetric with respect to yet another axis 316, circumferentially spaced apart from axis 314 and disposed circumferentially equidistant from central axis 310 and central axis 312, as indicated by equal angles $\beta 2$ (beta 2), which in this example are 45 degrees. Thus, the four axes 310, 312, 314, 316 are all lines of symmetry for hub manifold 110 and ports 164 in some embodiments. In some embodiments, angles $\alpha 1$, $\alpha 3$ are equal, and angles $\alpha 2$, $\alpha 4$ are equal but are different from angles $\alpha 1$, $\alpha 3$. In such embodiments, axes 314, 316 are lines of symmetry for hub manifold 110 and ports 164, but central axes 310, 312 are not. In the present example axes 310, 312 are perpendicular to each other, and axes 314, 316 are perpendicular to each other.

At least in embodiments like FIG. 3B, which include tubular members or tubular bosses extending from or combined as members of ports 164 in hub member 160, manifold 110 has hub and spoke arrangement. In various embodiments, ports 164 are formed without tubular members and may be internally threaded, suitable for welding, suitable for a press-fit operation, or suitable for another method of coupling known in the art.

Giving reference again to FIG. 1, distributed ports 164 of manifolds 110A, 110B are coupled to the flexible distribution lines 112 and flexible gathering lines 122, respectively. By these connection lines, fluidizers 124 are each coupled to a distributed port 164 of distributing hub manifold 110A and to a distributed port 164 of gathering hub manifold 110B for fluid communication. In FIG. 1, each distributed port 164 is coupled to a single fluidizer 124. Referring again to FIG. 3B, although four ports 164 are shown, hub manifold 110 may have more or fewer ports 164. As examples, some embodiments of hub manifold 110 have two, three, four, five distributed ports 164, and some embodiments may accommodate six, seven, or eight ports 164. Other embodiments of hub manifold 110 may include still more distributed ports 164, up to a practical limit based on space or another engineering principle. As indicated, some embodiments of hub manifold 110 have a quantity of distributed ports 164 that is not divisible by the number two. Some embodiments have an even number of distributed ports 164 while other embodiments have an odd number of distributed ports 164. A group of distributed ports 164 in hub manifold 110 may be symmetrically arranged with respect to another group of distributed ports 164 in the same hub manifold 110. For example, in FIG. 3B, distributed ports 164 are circumferentially and uniformly spaced with respect to each other, and multiple lines of symmetry may be identified, as described above.

Figure 4:
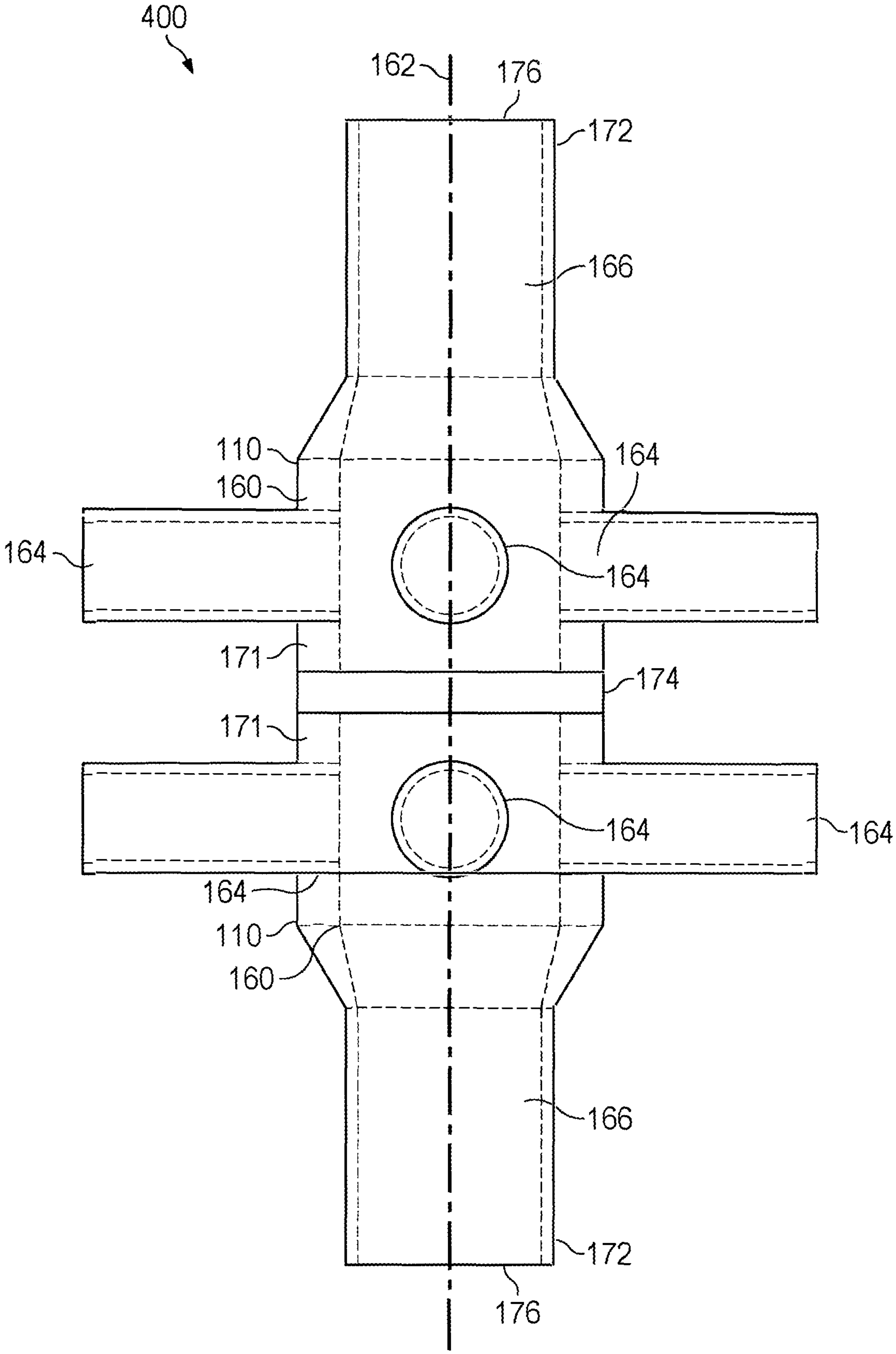
FIG. 4 shows a hub manifold assembly that includes a pair of the hub manifolds of FIG. 3A and FIG. 3B coupled together end-to-end in accordance with principles disclosed herein.

FIG. 4 introduces an embodiment of a hub manifold assembly 500 that includes a pair of hub manifolds 110 coupled together end-to-end. Each hub manifold 110 is as described with respect to FIG. 1, FIG. 3A, and FIG. 3B, including the possibility for any variations pertaining thereto, such as quantities and configurations of distributed ports 164. Each hub manifold 110 includes a hub member 160 with a passageway 166 extending along a longitudinal axis 162 generally from a closed first end 171 to an open second end 172 and a plurality of distributed ports 164 extending through hub member 160. For each, second end 172 includes a combined flow port 176, which is in fluid communication with corresponding passageway 166 and with the corresponding distributed ports 164. In this example the coupled hub manifolds 110 are disposed end-to-end at their sealed, first ends 171 and share a common cap 174. The shared cap 174 defines a fluid barrier between the passageways 166 of the hub manifolds 110. In some embodiments, a pair of caps 174 define a fluid barrier between the passageways 166. When oriented as shown, the combined flow ports 176 of the pair of hub manifolds 110 are directed in opposite directions. The pair of coupled hub manifolds 110 of FIG. 4 are suitable to be used as the manifolds 110A, 110B of the slurry dispensing system 100 in FIG. 1. Some other embodiments of slurry dispensing system 100 include a pair of manifolds 110A, 110B that are not coupled together and may be disposed close together or distal one another.

Figure 5:
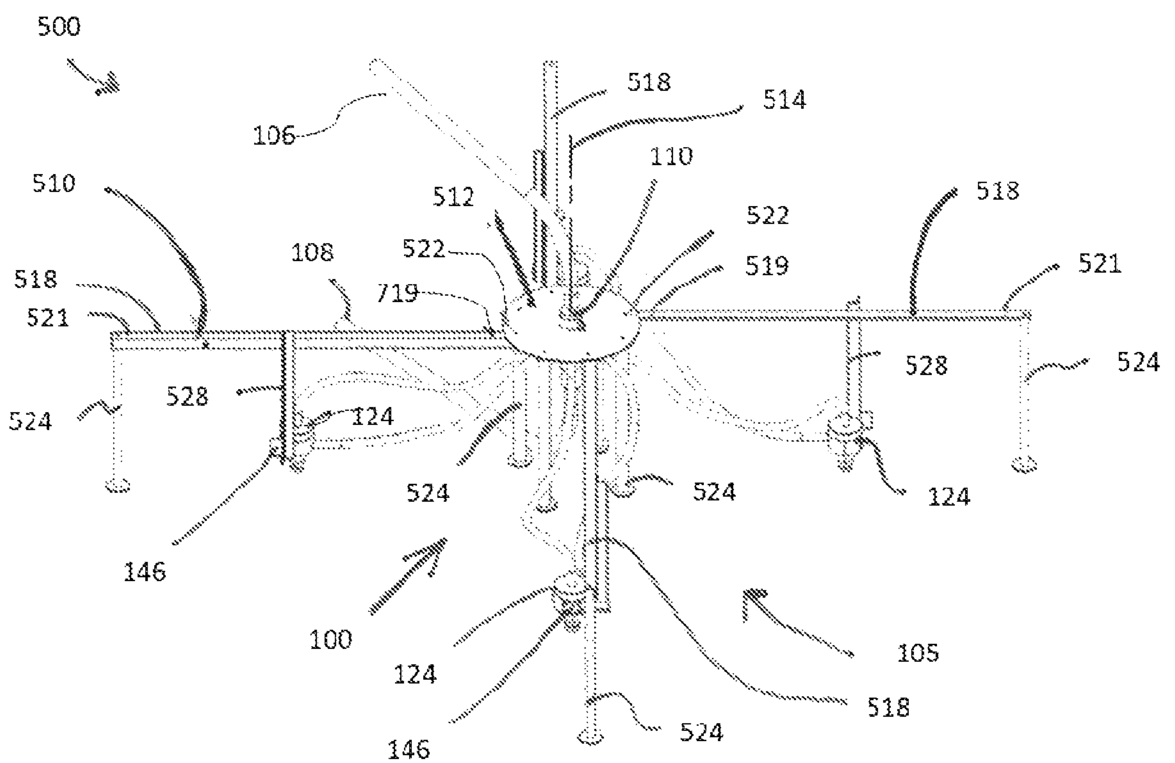
FIG. 5 shows another slurry dispensing system that includes a slurry intake assembly mounted to a support structure in accordance with principles disclosed herein.

FIG. 5 shows a slurry dispensing system 500 formed from a slurry intake assembly 105 (e.g., FIG. 1) mounted to a support structure 510 and coupled for fluid communication with an inlet line 106 and an outlet line 108. Slurry intake assembly 105, inlet line 106, and outlet line 108 are configured as described with respect to FIG. 1, including the possibility for any variations pertaining thereto.

Support structure 510 includes a horizontally extending central member 512 positioned on a primary axis 514, which is oriented vertically, and a plurality of support arms 518 adjustably mounted to and extending outward from the central member 512 from a proximal end 519 to a distal end 521. Arms 178 extend in generally radial directions with respect to the primary axis; although, the directions of support arms 518 may be adjusted before, during, and after assembly, without using a technique that causes a permanent modification, as would bending to achieve plastic deformation or welding, cutting, or separating by grinding, as examples. Proximal end 519 of a support arm 518 is coupled to central member 512 at a pivot joint 522, which allows the support arm 518 to be swung at least in a horizontal plane about a joint axis parallel to the primary axis. Joint 522 is formed by a first fastener, such as a bolt and nut, a pin and cotter key, or any other suitable arrangement known in the art. Joint 522 may be free-moving or may be tightened or immobilized with the first fastener or by a second fastener, as examples, and other joints on support structure 510 may be similarly configured. A first and a second leg 524 extend downward from each support arm 518 to rest movably on or to be coupled movably or fixedly to a horizontal or curved surface, such as the bottom of a vessel or pond. The several arms 518 and their multiple legs 524 support slurry dispensing system 500. In some implementations, support structure 510 may be installed independently of a slurry dispensing system 100, and may be useful for other versions of a slurry dispensing system or for another use. The current example includes four horizontal support arms 518, each holding one of four fluidizers 124. In some embodiments, any of the support arms 518 may accommodate more or fewer fluidizers. In some embodiments, more or fewer support arms are included. In the current example, central member 512 is embodied as a circular plate, but other two- or three-dimensional shapes may be used. In other embodiments, the hub manifold 110 may be modified to incorporate the function of central member 512. In this example, support structure 510 is configured like a hub and spoke of a wheel, albeit any of the spokes (i.e., the support arms 518) can be moved from a radial position. Central member 512 is positioned and coupled as the hub. In FIG. 5, slurry intake assembly 105, which includes a hub and spoke arrangement is held by a support structure 510, which also includes a hub and spoke arrangement.

In the example of FIG. 5, hub manifolds 110 are coupled to central member 512 and are supported by it. Mounting bracket 146 of each fluidizer 124 is coupled to an arm appendage 528 that extends downward from support arm 518 to which the arm appendage 528 is adjustably mounted; wherein, the concept of adjustability is as described above, with reference to support arms 518. Arm appendage 528 may be moved laterally or perpendicularly (for example, horizontally or vertically) with respect to the coupled support arm 518, with the coupled fluidizer moving as well. Thus, fluidizers 124 are movably mounted along the length of support arms 518. Options include moving fluidizer 124 along arm appendage 528 and pivoting fluidizer with respect to arm appendage 528 or support arm 518. Fluidizer 124 has been described as being coupled to arm appendage 528 or support arm 518 by mounting bracket 146, but in some embodiments, a fluidizer of 124 is instead coupled to arm appendage 528 or support arm 518 by a clamping strap (not shown) or by another method known in the art. Alternatively, a fluidizer 124 may be directly coupled to a support arm 518 and may be movably mounted along the support arm.

The configuration of the support structure 510, as disclosed, and the adjustable coupling of each fluidizer 124 to support structure 510 allows the position, and in some embodiments the angular orientation, of each fluidizer 124 to be adjusted independently in one, two, or three dimensions. Any of the fluidizers 124 may be moved relative to the coupled support arm 518, central member 512, or hub manifolds 110 without modifying any fluid connection between a hub manifold 110 and the fluidizer 124. Thus in various embodiments, as examples, a fluidizer 124 may be moved or rotated without loosening, without disconnecting, or without connecting any fluid connection on the corresponding distribution line 112 and gathering line 122. Even so, in some embodiments or during methods of operation, it may be advantageous to loosen, to disconnect, or to connect a fluid connection associated with a fluidizer 124 prior to moving fluidizer 124. The decision to loosen, to disconnect, or to connect may be based on the angular or the lateral distance by which fluidizer 124 is to be moved, as examples.

Some embodiments or methods of operation may require loosening a fluid connection prior to moving fluidizer 124. Some embodiments or methods of operation may require disconnecting or connecting a fluid connection prior to moving fluidizer 124. The flexibility of lines 112, 122 facilitates the repositioning of a fluidizer 124 with respect to support structure 510 or a hub manifolds 110. Before and after assembly, the position or orientation of fluidizer 124 may be adjusted relative to support structure 510 or hub manifold 110 without using a technique that causes a permanent modification, as would bending to achieve plastic deformation or welding, as examples. Therefore, the positional adjustment of fluidizer 124 may be done without exceeding the elastic strain limit of the support structure, without exceeding the elastic strain limit of the plumbing, and without modification by welding, cutting, and separating by grinding, as examples. The adjustable coupling of fluidizer 124 for support allows fluidizer 124 to move on the order of millimeters, centimeter, tens of centimeters, or meters, in various embodiments. Even so, any known permanent method of altering the support structure or the position of a fluidizer 124 may be used if desired.

Continuing to reference FIG. 5 fluidizers 124 are each coupled to structural support 510, which provides support independently of any plumbing, such as the gathering lines 122 and distribution lines 112, which are flexible and movable. That is to say, in some embodiments, gathering lines 122 and distribution lines 112 provide no support, negligible support, or insufficient support to hold fluidizers 124 in a fixed position or orientation. The support structure for fluidizers in FIG. 5 is distinct from the plumbing, but some embodiments combine these techniques for structural support.

Even so, in some embodiments based on slurry dispensing system 500 of FIG. 5, the relative movement of fluidizer 124 is restricted or immovable relative to hub manifolds 110, relative to support structure 510, or relative to another support structure. As an example, a fluidizer of 124 may be coupled to arm appendage 528 or support arm 518 by welding or another method that limits the degrees of freedom of movement of fluidizer 124 and requires permanent modification to alter the coupling. Also, or alternatively, some or all components of support structure 510 may be welded together instead of being movably coupled, as an example.

In the embodiments of FIG. 1 and FIG. 5, the outlet hub manifold 110B is configured and oriented such that, at the location the multiple ports 164 merge into passageway 166, passageway 166 extends downward through reducing taper 178 and the combined flow port 176, which is configured as an outlet port for slurry intake assembly 105. The reducing taper 178 leading to exit port 176 increases the velocity of fluid flow with the goal of keeping solids suspended in a slurry. In this orientation, the combined flow port 176 of outlet hub manifold 110B is directed downward into the outlet line 108, which is at least partially located below manifold 110B. Outlet line 108 begins with a vertically downward portion and transitions to a horizontal path to reach a distal destination. This downward flow path from the passageway 166 to outlet line 108 may help to keep an extracted slurry suspended, reducing the potential for solid particle to drop from the mixture. Even so, in some embodiments, passageway 166 and exit port 176 of outlet hub manifold 110B may be directed upward, horizontally, or at another orientation that is not downward.

As used herein, including the claims, any of the terms balance, balanced flow, flow balance(d), hydraulically balanced, balanced with respect to fluid flow, or similar related expressions used in reference to a plurality of lines or systems for fluid communication refers to any of the following features or conditions: equal length and diameter, equal length and hydraulic diameter, equal quantity or same arrangement of similar components (as examples: any of various pipe segments having similar length and diameter, elbows, instruments, valves, nozzles, or flow straighteners, any of which have been included in the particular lines or systems), equal pressure drop characteristics for similar inlet or outlet conditions, equal flow rate for similar inlet or outlet conditions, sharing another configuration known in the art to promote equal pressure drop or flow rate, or a combination of any of these balancing features. When balancing a plurality of lines or flow systems, the diameter considered for corresponding components may be the inner diameter, outer diameter, nominal diameter, or hydraulic diameter. When outer diameter or nominal diameter is used to balance components, it may be advantageous or appropriate to consider also the wall thickness or schedule of the material (e.g., pipe schedule) to account for the actual flow area. When promoting or achieving balanced lines or systems, the internal roughness of flow passages may be considered. In summary, the goal of balancing a group of flow components, flow lines, or flow systems is to establish parameters or conditions that promote or achieve equal pressure drop or flow rate when a fluid or slurry flows within the group of flow components, flow lines, or flow systems. Likewise, balancing a flow involves establishing configurations or conditions that promote or cause equal flow rates or pressure drops between lines, systems, or groups operating in parallel. Of course, in various embodiments, flow balancing is achieved prior to any fluid flowing or while fluid flow is stopped. When a characteristic or feature is disclosed herein as being equal among a plurality of components or systems in various embodiments, it is understood that the same characteristic or feature may be, more broadly, substantially equal in some additional embodiments.

A slurry dispensing system 100 or modifications thereof having a hub manifold 110, a flexible distribution line 122, or a flexible gathering line 112 may be implemented in a vessel such as tank. In some embodiments a slurry dispensing system includes a hub manifold 110 coupled by rigid piping to a fluidizer 124, 324.

Various embodiments disclosed herein, including embodiments of slurry dispensing systems, slurry intake assemblies, support structures, and manifolds, are believed to provide an advantage or multiple advantages over prior art systems. For some of these embodiments, these advantages may include one or more of the following, as examples:

- Reduced length of flow path between each fluidizer and water and slurry connection points, which lowers the energy required to move fluids through the system;
- Reduced quantity of fittings such as elbows and tees, which reduces number of welds or other joints, thereby lowering overall cost to manufacture;
- Flexibility in fluidizer spacing and placement, allowing mass production of embodiments that can be uniquely configured for a particular installation without custom design and manufacturing; and
- Flexibility in the number of fluidizers that can be coupled to a single manifold while achieving a hydraulically balanced configuration for the fluidizers.

While exemplary embodiments have been shown and described, modifications thereof can be made by one of ordinary skill in the art without departing from the scope or teachings herein. The embodiments described herein are exemplary only and are not limiting. Many variations, combinations, and modifications of the systems, apparatuses, and processes described herein are possible and are within the scope of the disclosure. Accordingly, the scope of protection is not limited to the embodiments described herein, but is only limited by the claims that follow, the scope of which shall include all equivalents of the subject matter of the claims. The inclusion of any particular method step or operation within the written description or a figure does not necessarily mean that the particular step or operation is necessary to the method. The steps or operations of a method listed in the specification or the claims may be performed in any feasible order, except for those particular steps or operations, if any, for which a sequence is expressly stated. In some implementations two or more of the method steps or operations may be performed in parallel, rather than serially.

What is claimed is:

1. A slurry dispensing system for delivering and extracting a fluid from a volume, the system comprising:

a slurry intake assembly including:

a hub manifold including: (1) a hub member extending along a longitudinal axis, (2) a passageway extending along the longitudinal axis from a first end to a second end of the hub member, and (3) a plurality of distributed ports in fluid communication with the passageway; and a plurality of fluidizers, each fluidizer including: (1) a fluid inlet to receive the fluid, (2) a fluid outlet to discharge the fluid into the volume, and (3) a slurry inlet to receive a slurry from the volume;

the fluid inlet of each fluidizer is fluidly coupled to a corresponding distributed port of the plurality of distributed ports for fluid communication;

wherein the plurality of distributed ports are disposed at the hub member and are spaced apart from one another, and wherein the each fluidizer further includes a slurry outlet, which is in fluid communication to the slurry inlet, and the slurry outlet is fluidly connected to a corresponding distributed port of a second hub manifold.

2. The slurry dispensing system of claim 1, further comprising:

a support structure to which a first fluidizer of the plurality of fluidizers is coupled for support;

wherein the support structure allows the first fluidizer to be moved relative to the position of the hub manifold without disconnecting any fluid connection between the hub manifold and the first fluidizer.

3. The slurry dispensing system of claim 1, wherein the hub manifold is a first hub manifold, and the slurry intake assembly further comprises:

the second hub manifold that includes: (1) a hub member extending along the longitudinal axis, (2) a passageway extending along the longitudinal axis from a first end to a second end of the second hub member, and (3) a plurality of distributed ports in fluid communication with the passageway, wherein each fluidizer is coupled to a distributed port of the first hub manifold by a first flexible line for fluid communication and is coupled to a distributed port of the second hub manifold by a second flexible line for fluid communication.

4. The slurry dispensing system of claim 3 wherein the hub members of the first and second hub manifolds are disposed end-to-end, sharing a cap that defines a fluid barrier between the passageways of the first and second hub manifolds.

5. The slurry dispensing system of claim 3, further comprising:

a support structure to which the first hub manifold and the plurality of fluidizers are coupled for support;

wherein the mounting of each fluidizer to the support structure allows each fluidizer to be moved relative to the position of the first hub manifold without disconnecting any fluid connection between the first hub manifold and the fluidizer.

6. The slurry dispensing system of claim 3, further comprising:

a support structure that includes a plurality of support arms;

wherein each fluidizer is coupled to a support arm of the plurality of support arms, and the position of each fluidizer is independently adjustable relative to the first hub manifold without using a technique that causes a permanent modification.

7. The slurry dispensing system of claim 3, wherein the first end of the passageway of each of the first and second hub manifolds is closed and the second end of the passageway of each of the first and second hub manifolds is open, the system further comprising:

a first line coupled to the second end of the first hub manifold for fluid communication; and a second line coupled to the second end of the second hub manifold for fluid communication;

wherein the first line or the second line includes flexible piping.

8. The slurry dispensing system of claim 3, wherein each fluid inlet of the plurality of fluidizers is fluidly connected to the passageway of the first hub manifold, and wherein each slurry inlet of the plurality of fluidizers is fluidly connected to the passageway of the second hub manifold.

9. The slurry dispensing system of claim 1, wherein the fluid outlet of the each fluidizer is open to the volume.

10. A slurry dispensing system for delivering and extracting a fluid from a volume, the system comprising:

a slurry intake assembly including a first hub manifold and a second hub manifold, each of the first and second hub manifolds including: (1) a hub member extending along a longitudinal axis, (2) a passageway extending along the longitudinal axis from a first end to a second end of the hub member, and (3) a plurality of distributed ports in fluid communication with the passageway; and a plurality of fluidizers, each fluidizer including: (1) a fluid inlet to receive the fluid from the first hub manifold, (2) a fluid outlet to discharge the fluid into the volume, and (3) a slurry inlet to receive a slurry from the volume and supply the slurry to the second hub manifold, wherein the fluid inlet of each fluidizer is fluidly coupled to a corresponding distributed port of the plurality of distributed ports of the first hub manifold for fluid communication, and wherein the plurality of distributed ports for each of the first and second hub manifolds is disposed at the corresponding hub member and the ports are spaced apart from one another.

11. The slurry dispensing system of claim 10, further comprising:

a support structure to which a first fluidizer of the plurality of fluidizers is coupled for support;

wherein the support structure allows the first fluidizer to be moved relative to the position of the first hub manifold without disconnecting any fluid connection between the first hub manifold and the first fluidizer.

12. The slurry dispensing system of claim 10, wherein the hub members of the first and second hub manifolds are disposed end-to-end, sharing a cap that defines a fluid barrier between the passageways of the first and second hub manifolds.

13. The slurry dispensing system of claim 10, further comprising:

a support structure to which the first hub manifold and the plurality of fluidizers are coupled for support;

wherein the mounting of each fluidizer to the support structure allows each fluidizer to be moved relative to the position of the first hub manifold without disconnecting any fluid connection between the first hub manifold and the fluidizer.

14. The slurry dispensing system of claim 10, further comprising:

a support structure that includes a plurality of support arms;

wherein each fluidizer is coupled to a support arm of the plurality of support arms, and the position of each fluidizer is independently adjustable relative to the first hub manifold without using a technique that causes a permanent modification.

15. The slurry dispensing system of claim 10, wherein the first end of the passageway of each of the first and second hub manifolds are closed and the second end of the passageway of each of the first and second hub manifolds are open, the system further comprising:

a first line coupled to the second end of the first hub manifold for fluid communication; and a second line coupled to the second end of the second hub manifold for fluid communication;

wherein the first line or the second line includes flexible piping.

16. The slurry dispensing system of claim 10, wherein each fluid inlet of the plurality of fluidizers is fluidly connected to the passageway of the first hub manifold, and wherein each slurry inlet of the plurality of fluidizers is fluidly connected to the passageway of the second hub manifold.

17. The slurry dispensing system of claim 10, wherein the fluid outlet of the each fluidizer is open to the volume.

18. The slurry dispensing system of claim 10, wherein the each fluidizer further includes a slurry outlet, which is in fluid communication to the slurry inlet, and the slurry outlet is fluidly connected to a corresponding distributed port of the second hub manifold.

* * * * *